UNITED STATES PATENT OFFICE.

GABRIEL YOUNGWITZ, OF NEW YORK, N. Y.

IMITATION LEATHER.

SPECIFICATION forming part of Letters Patent No. 715,928, dated December 16, 1902.

Application filed July 24, 1902. Serial No. 116,873. (No specimens.)

*To all whom it may concern:*

Be it known that I, GABRIEL YOUNGWITZ, a citizen of the United States, residing at Manhattan borough, New York city, in the county and State of New York, have invented new and useful Improvements in Imitation Leather, of which the following is a specification.

This invention relates to a new article of manufacture, which can be used as imitation of leather, and is serviceable for various purposes—as, for example, manufacturing vizors for caps and other purposes. In preparing this article a foundation of ground cork and burlap is employed, also known in the trade as "linoleum." This foundation is provided with a coating or rather a series of coatings, as follows: The first coat is composed of the following ingredients in substantially the proportions stated: lampblack, ten pounds; linseed-oil, ten pounds; naphtha, twelve pounds. These ingredients are thoroughly mixed by stirring or agitation. This operation can be carried on at ordinary temperature. The linseed-oil is of the consistency also known as "sweetmeat"—that is, linseed-oil boiled to a jelly-like or stringy consistency. This coat is applied to both sides of the foundation material or uniformly spread over the surface thereof. An ordinary brush can be employed for this purpose. The article is then put into a heat-room of about 180° Fahrenheit until dry. Heating for an average period of about twelve hours has been found to suffice for drying. The second coat is composed of lampblack, about five pounds; linseed-oil, about ten pounds; naphtha, about twenty pounds. The ingredients are mixed as before. The linseed-oil now used is also boiled, but not so much, the oil being used at a molasses-like consistency or somewhat more fluid than in the first coat. This second coat is spread or painted onto the first coat when such first coat is dry and is then likewise dried in a suitable heat room or space. The third coat is composed of black varnish and blacking in about equal parts and reduced or thinned by naphtha sufficiently to brush. Usually one-half, by weight, of naphtha to one-half, by weight, of varnish and blacking will answer. These ingredients are mixed as before. This third coat is applied to the second coat when such second coat is dry and is then likewise dried by heat, as stated. The fourth coat may also be called the varnish or last coat. It is composed of black varnish and naphtha, usually in equal parts or thin enough to admit of brushing, so that this coat will flow. The ingredients are mixed as before. This coat is applied to the preceding coat when dry and is then in its turn dried. The above four coats give a black and glossy appearance, resembling patent-leather.

It may be noted that if the substance remains porous or not sufficiently saturated after the application of the second coat a repeated application and drying of this coat No. 2 can be made until the operator secures a satisfactory saturation.

Should it be desired to obtain a colored surface—say green—then the last coat is modified as follows: black varnish, about ten pounds; green paint, (dry powdered color,) about five pounds; yellow paint, (dry powdered color,) about two pounds; naphtha, about fifteen pounds or sufficient to secure a flowing coat. This color coat is generally applied twice, being dried after each application, and leaves the foundation with a green glossy finish. For such articles as cap-vizors, where one side is generally black and the other green, the above process has been found practically applicable. If not to be left black or green, however, any suitable paint can be applied to the dry glossy surface. It is also to be noted that all these coats in practice were used in connection with a drier. Ordinary driers will do in proportions as known to varnish-makers, varying generally from about ten to about twelve per cent., by weight.

What I claim as new, and desire to secure by Letters Patent, is—

1. The process of producing imitation leather, consisting in coating a body of suitable material with coatings of a composition consisting of lampblack, linseed-oil and naphtha, then subjecting the coated material to a suitable temperature to thoroughly dry it, then coating the dried material with a composition consisting of black varnish, blacking and naphtha, then suitably drying the same, and then suitably varnishing the dried material.

2. The process of producing imitation leather, consisting in coating a body of suitable material with a composition consisting of lampblack, linseed-oil and naphtha, then subjecting the coated material to a suitable temperature to thoroughly dry it, then applying a second coating of the same composition and subjecting the same to a suitable temperature to thoroughly dry it, then coating the dried material with a composition consisting of black varnish, blacking and naphtha, then subjecting the same to a suitable temperature to thoroughly dry it, and then suitably varnishing the dried material.

3. The process of producing imitation leather, consisting in coating a body of suitable material with a composition consisting of ten parts by weight of lampblack, ten parts by weight of linseed-oil and twelve parts by weight of naphtha, then subjecting the coated material to a suitable temperature to thoroughly dry it, then coating the dried material with a composition consisting of black varnish, blacking and naphtha, then subjecting the same to a suitable temperature to thoroughly dry it, and then suitably varnishing the dried material.

4. The process of producing imitation leather, consisting in coating a body of suitable material with a composition consisting of lampblack, linseed-oil and naphtha, then subjecting the coated material to a suitable temperature to thoroughly dry it, then applying a second coating of a composition consisting of five parts by weight of lampblack, ten parts by weight of linseed-oil and twenty parts by weight of naphtha, then subjecting the same to a suitable temperature to thoroughly dry it, then coating the dried material with a composition consisting of black varnish, blacking and naphtha, then subjecting the same to a suitable temperature to thoroughly dry it, and then suitably varnishing the dried material.

5. The process of producing imitation leather, consisting in coating a body of suitable material with a composition consisting of lampblack, linseed-oil of a jelly-like consistency and naphtha, then subjecting the coated material to a suitable temperature to thoroughly dry it, then applying a second coating of the same composition and subjecting the same to a suitable temperature to thoroughly dry it, then coating the dried material with a composition consisting of black varnish, blacking and naphtha, then subjecting the same to a suitable temperature to thoroughly dry it, and then suitably varnishing the dried material.

6. The process of producing imitation leather, consisting in coating a body of suitable material with a composition consisting of lampblack, linseed-oil and naphtha, then subjecting the coated material to a suitable temperature to thoroughly dry it, then applying a second coating of a composition consisting of lampblack, linseed-oil of a molasses-like consistency and naphtha, then subjecting the same to a suitable temperature to thoroughly dry it, then coating the dried material with a composition consisting of black varnish, blacking and naphtha, then subjecting the same to a suitable temperature to thoroughly dry it, and then suitably varnishing the dried material.

In testimony whereof I have hereunto set my hand in the presence of two subscribing witnesses.

GABRIEL YOUNGWITZ.

Witnesses:
CHAS. E. POENSGEN,
E. F. KASTENHUBER.